(12) United States Patent
Lansley et al.

(10) Patent No.: US 6,470,276 B1
(45) Date of Patent: Oct. 22, 2002

(54) METHOD OF DETERMINING MERIT OF OFFSET AND AZIMUTH DISTRIBUTIONS IN SEISMIC DATA ACQUISITION

(75) Inventors: Roy Malcolm Lansley, Bellville, TX (US); David Nyland, Palmer, AK (US); Ronald E. Chambers, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 09/575,261

(22) Filed: May 19, 2000

Related U.S. Application Data

(63) Continuation-in-part of application No. 09/318,281, filed on May 25, 1999, now abandoned.

(51) Int. Cl.$^7$ .................................................. G01V 1/28
(52) U.S. Cl. ....................................................... 702/16
(58) Field of Search .............................. 702/16, 14, 17; 367/73, 70; 703/2, 6, 10

(56) References Cited

U.S. PATENT DOCUMENTS

| | | | |
|---|---|---|---|
| 5,430,689 A | 7/1995 | Rigsby et al. | 367/15 |
| 5,465,722 A | 11/1995 | Fort et al. | 128/661.01 |
| 5,963,879 A | 10/1999 | Woodward et al. | 702/17 |
| 5,995,907 A | 11/1999 | Van Bemmel et al. | 702/16 |
| 6,082,822 A | 2/2000 | Lansley et al. | 367/62 |

*Primary Examiner*—Donald E. McElheny, Jr.
(74) *Attorney, Agent, or Firm*—Madan, Mossman & Sriram, P.C.

(57) ABSTRACT

A seismic survey area is divided into a number of "bins" of a convenient shape and size. The data from the suite of shot and receiver positions are analyzed and all shot-receiver pairs that have a common sort point (CSP) are assigned to the spatial bin in which the CSP is located. The CSP maybe a common mid-point (CMP). The data within each bin are analyzed to give a figure of merit of the adequacy of the sampling for each bin. These figures of merit are displayed in a color display that makes the inadequacies of the sampling apparent, making it possible to modify the planned acquisition geometry prior to the actual deployment of the receiver lines. Alternatively, a figure of merit is determined for the overall survey.

22 Claims, 7 Drawing Sheets

(1 of 7 Drawing Sheet(s) Filed in Color)

METHOD OF DETERMINING MERIT OF OFFSET AND AZIMUTH DISTRIBUTIONS IN SEISMIC DATA ACQUISITION

CROSS-REFERENCES TO RELATED APPLICATIONS

This application is a continuation-in-part of U.S. patent application Ser. No. 09/318,281 filed on May 25, 1999, abandoned.

BACKGROUND OF THE INVENTION

1. Field of the Invention

This invention is in the field of seismic surveying, and is more specifically directed to the evaluation of the quality of acquisition of three dimensional seismic data in an onshore or offshore environment.

2. Background of the Art

In reflection seismology, acoustic waves are imparted into the earth, generally by activation of a seismic source. Acoustic receivers detect the acoustic waves after their reflection from sub-surface strata and interfaces. Analysis of the acoustic waves, together with the known position of the source and receiver is used to provide an image of the subsurface.

In conventional 2-D surveys, the acoustic receivers are deployed in a line and the source is collinear with the receivers. In marine seismic surveys, 2-D surveys are generally performed by a vessel that tows a source, such as an air gun, followed by a streamer of hydrophones. Other types of 2-D marine surveys use receivers deployed on the ocean bottom with the source being towed by a vessel. A 2-D survey provides survey information relative only to a vertical plane into the earth.

Most seismic surveys carried out at present are three-dimensional (3-D) surveys. The surveying of an area by way of multiple parallel 2-D surveys has been referred to in the art as "3-D" seismic surveys, as an image of a subsurface region of the earth is generated. However, this type of survey is not truly "3-D," as information is acquired only at two source-receiver angles, or azimuths, with these two azimuths at a 180° angle relative to each other. If the lines of a multiple 2-D survey are sufficiently close together, it is possible to process the data to account for the fact that the reflections of the seismic waves do not originate from a vertical plane through the lines of the survey.

Conventional seismic analysis techniques "stack" multiple traces of acoustic amplitude versus time for midpoints within a certain vicinity of the same location (such vicinity generally referred to as the "bin"), reinforcing the "signal" portion of the traces while the random acoustic "noise" tends to cancel out. As is well known, it is preferable that the multiple stacked traces for a given bin correspond to varying source-receiver offset distances, with normal move-out ("NMO") and/or dip move-out ("DMO") operations adjusting for the difference in travel time versus offset for a particular midpoint. Such stacking, or gathering, of trace data is conventionally referred to as common depth point ("CDP") or common midpoint ("CMP") stacking, with the number of traces for a given bin generally referred to as the "fold" of the survey for that bin.

It is preferable for proper imaging of the subsurface that the seismic wavefield be uniformly sampled areally. Some processing steps such as stacking, multi-channel filtering, DMO correction, prestack migration, velocity analyses, anisotropy studies and wavefield extrapolation require that the data be uniformly sampled in offset and/or azimuths. This ideal sampling distribution may be difficult to obtain in land and marine seismic surveys at a reasonable cost. Even in the absence of obstructions such as platforms, a strong cross current will cause a degradation in the sampling of different offsets and azimuths in a marine seismic survey. In addition, in land seismic surveys, obstructions such as buildings, roads, or gaps in coverage where the landowner refuses to give a permit for surveying further complicate the acquisition. In marine seismic surveys, obstructions such as platforms make the acquisition of data with uniform sampling difficult or impossible. In conventional marine surveys with detectors located on streamers towed by a ship, the obstruction makes it impossible for the ship to follow a path that gives uniform coverage. In ocean bottom surveys where the data are recorded on sensors located on the ocean bottom, it is difficult to lay down detectors near obstructions.

If the sampling is too sparse, then processing methods such as migration and k-f filtering will produce artifacts due to aliasing of the data. If the sampling does not adequately cover a sufficiently large range of offsets, then the processing methods will not adequately suppress noises in the data. It is therefore desirable to have an invention in which an acquisition geometry for 3-D seismic data acquisition can be evaluated to determine its adequacy in terms of suppression of noise and absence of aliasing. The present invention satisfies the need.

SUMMARY OF THE INVENTION

A planned survey comprises several lines of receivers that detect seismic reflections produced by sources on a plurality of lines. In a conventional marine survey, the sources are deployed from ships and the detectors are on streamer cables towed by the ship. In ocean bottom surveys, the detectors are deployed at the bottom of a body of water and a source vessel travels along a planned series of paths periodically firing a conventional seismic source; the detectors may be on a cable for carrying signals received by the detectors or may be provided with transmitters for sending the signals by telemetry to a remote location for further processing. The survey area is divided into a number of "bins" of a convenient shape and size, such as squares with a side equal to half the receiver spacing (when the receivers are equally spaced on the receiver lines). The data from the suite of shot and receiver positions are analyzed and all shot-receiver pairs that have a common sort point are assigned to the spatial bin in which the sort point is located. For P- wave prospecting, the sort point is midway between the source and the receiver and the sort point is a CMP. For converted wave surveying, the sort point is usually between one-half and two-thirds of the distance from the source to the receiver. The data within each bin are analyzed to give a figure of merit of the adequacy of the sampling for each bin. These figures of merit are displayed in a color display that makes the inadequacies of the sampling apparent, making it possible to modify the planned acquisition geometry prior to the actual acquisition. Those versed in the art would recognize that it is not necessary for each of the receiver locations in a survey to be recording data corresponding to seismic waves transmitted from each of the source locations in the survey.

BRIEF DESCRIPTION OF THE DRAWINGS

The file of this patent contains at least one drawing executed in color: Copies of this patent with color drawing(s) will be provided by the Patent and Trademark Office upon request and payment of the necessary fee.

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENTS

Figure 1A:
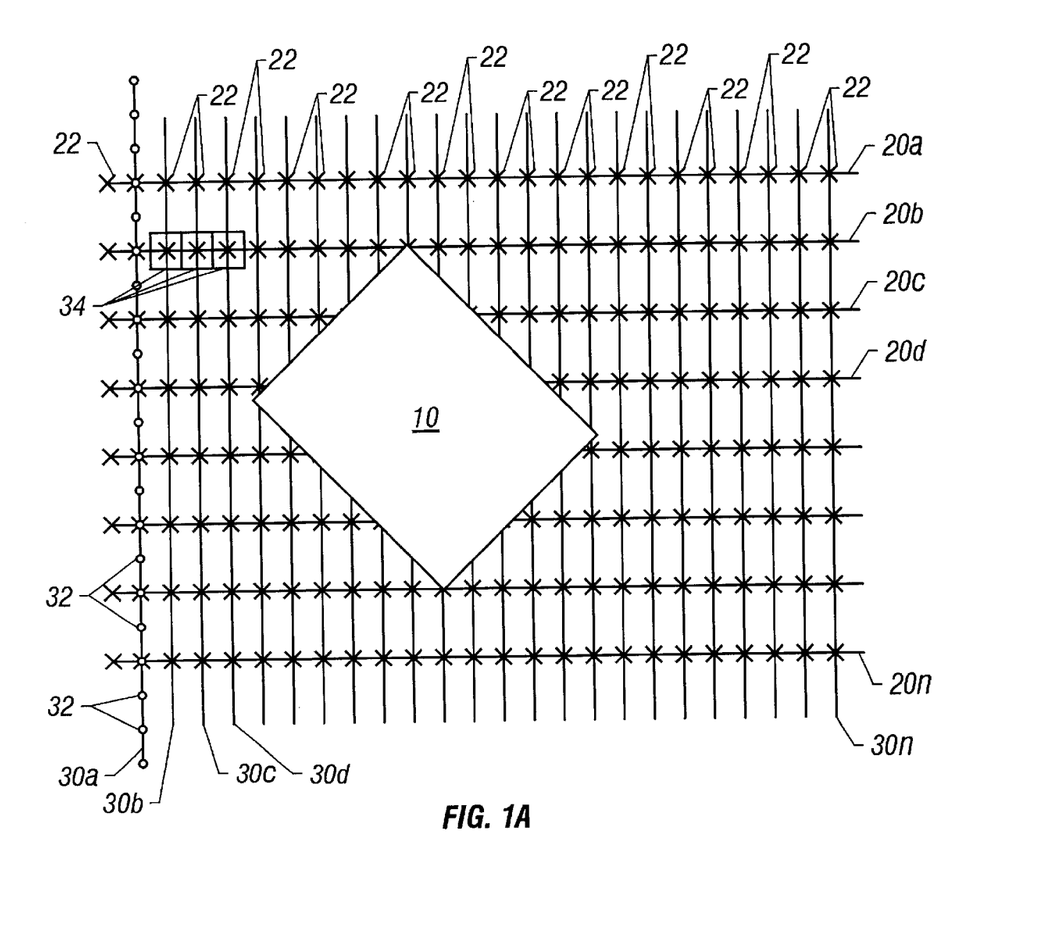
FIGS. 1a–1c are plan illustrations of surveys performed according to a first embodiment of the invention.

Referring now to FIG. 1a, a plan view of a portion of a marine survey according to a first embodiment of the invention will now be described in detail. Shown is an obstruction 10 such as a platform in a marine seismic survey. A plurality of planned seismic receiver lines 20a, 20b, 20c, . . . 20n are shown. Each receiver line, such as 20a, includes a plurality of receiver stations 22 deployed at the ocean bottom. For simplifying the illustration, only a few of the receiver stations are labeled. The receivers at stations 22 are of the conventional type for receiving the reflected seismic energy of interest, and as such may consist of a single receiver, but preferably includes multiple receivers. Multiple receivers associated with a receiver station 22 may be located near the same point, or spread out about a central location over a given distance.

The types of receivers included within receiver stations 22 is determined from the type of seismic energy to be detected. Examples of conventional receivers useful in this embodiment of the invention include conventional gimbaled geophones deployed in contact with the sea floor. Those versed in the art would know that geophones detect energy in the form of velocity of particle motion, and receive directional information. In a commonly used method, conventional geophones are arranged to detect vertical, inline and crossline particle velocity. Those versed in the art would recognize that crossline and inline geophones are examples of horizontal motion geophones and have meaning only when there is a reference line with respect to which motion is measured. Where the survey geometry does not consist of receivers deployed along straight lines, the term "horizontal motion geophone" is a more accurate description. Those versed in the art would recognize that other configurations of the orientation of the axes of the phone have been used, e.g., oriented towards the edges of a tetrahedron. Instead of geophones, other types of motion sensors such as accelerometers may be used.

Alternatively, or in addition to conventional geophones, the receivers may include conventional hydrophones that are deployed on or above the sea floor. As is well known, hydrophones detect seismic energy transmitted as pressure, without a directional indication.

The preferred seismic source is a conventional marine seismic source towed behind a conventional seismic vessel. Because the towed source will be fired periodically, the preferred source of seismic vibrations is a compressed air gun or other source capable of periodic firing. The effect of the obstruction on the proposed deployment of the receiver lines and of the movement of the seismic source is evident.

According to the embodiment of the invention shown in FIG. 1a, the source vessel travels along lines 30a, 30b, 30c, . . . 30n. At locations 32 along each of the lines, the source is fired while the vessel is traveling. Also shown in FIG. 1 are bins 34 which, in this example, are square shaped and centered on the receiver locations. Those versed in the art would recognized that other shapes and sizes could be used. Those versed in the art would also recognize that for many seismic processing applications, it is important to have equal sized bins, so that if the receiver lines are not parallel, the coincidence between the receiver locations and the locations of the center of the bins as indicated in FIG. 1a is not present.

In implementation of a survey geometry such as that shown in FIG. 1a, accurate surveying of the locations of the receiver locations and of the source positions is necessary. Methods of doing this survey would be known to those versed in the art. Given a source and receiver location for a proposed survey as indicated in FIG. 1a, the present invention analyzes every combination of source position with each receiver position that records seismic signals emanating from the source position and determines a midpoint location and also identifies the bin within which the midpoint falls. The CMP is a special case of a common sort point (CSP) discussed below.

Figure 1B:
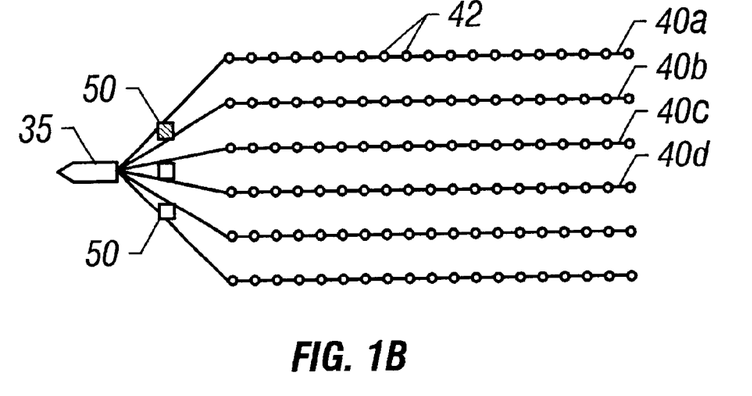

FIG. 1b shows a plan view of an example of acquisition geometry for marine surveys in which streamers 40a, 40b, 40c . . . are towed by a ship 35. The receivers 42 on the streamers are hydrophones that are sensitive to pressure signals in the water. The seismic sources 50 are deployed off the ship 35 and at regular intervals while the ship is in motion, send out seismic signals that are reflected by reflecting horizons (not shown) in the earth back to the receivers 42. Bins (not shown) similar to those shown in FIG. 1a care used in analysis of this type of shooting geometry.

Figure 1C:
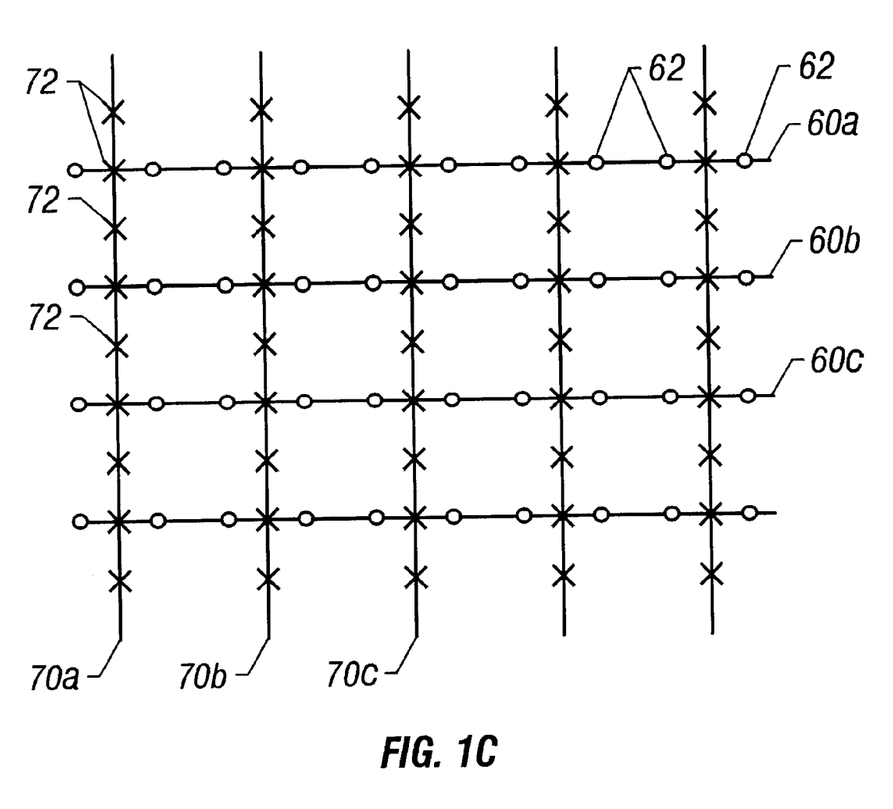

FIG. 1c shows a plan view of an example of acquisition geometry for 3-D acquisition on land. The receiver lines 60a, 60b, 60c . . . have a plurality of receivers 62 placed along the lines while the sources 72 are along lines 70a, 70b, 70c . . . Bins (not shown) similar to those shown in FIG. 1a care used in analysis of this type of shooting geometry.

Other types of geometries would be familiar to those versed in the art and the present invention can be used for any such type of acquisition geometry.

Figure 2:
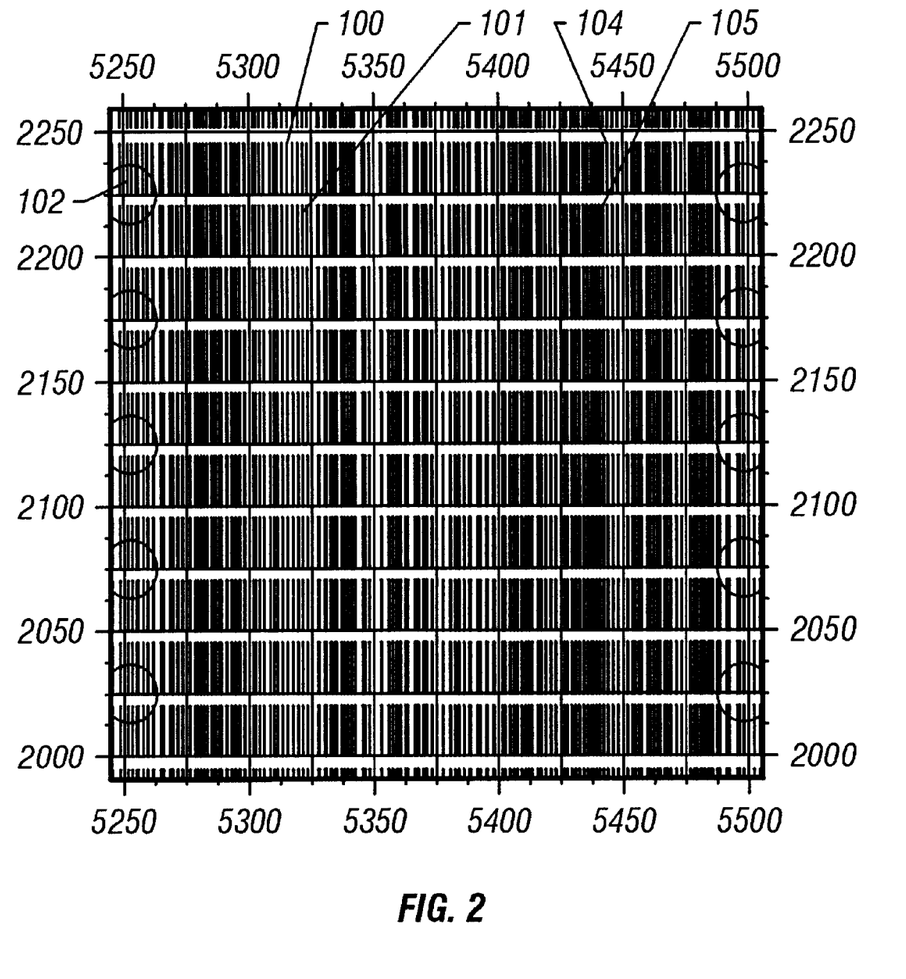
FIG. 2 is an illustrative example showing the distribution of offsets within survey bins of a planned survey.

FIG. 2 illustrates the results of a seismic survey in which this process of binning has been carried out. III the example, each bin is a square of side 25 meters. Within each bin, in the form of a bar chart, is the source-receiver offset for all the traces within the bin. The source-receiver distances are plotted on a scale that ranges from a minimum to a maximum value that is determined by the acquisition geometry, the scale being the same for each of the bins. As can be seen in the display, there is considerable variation in the relative distribution of source-receiver offset distances within the bins. U.S. Pat. No. 5,430,689 to Rigsby shows a similar display in which, instead of the actual distances within a bin being plotted, a histogram is shown wherein ranges of distances are combined. A limitation of a display such as FIG. 2 is that it is not immediately obvious which of the bins have the "best" sampling of offset distances. The bins that stand out visually are not necessarily the same ones that, upon closer examination, turn out to have the most uniform distribution of offset distances. While bins such as 102 can be clearly seen as having a very sparse sampling of offset distances, it is difficult, at first glance, to decide whether, e.g., bin 100 is better than bin 101, or whether bin 104 is better than bin 105.

The present invention determines a statistical measure of uniformity of distribution of offsets. Denoting by $\{x_i, i=1, 2, 3, \ldots N\}$ as the source-receiver offset distance within a CDP bin, it is clear that if all the distances are uniformly spaced, then the successive increments between the offset distances would all be $(x_n-x_1)/(N-1)$. One embodiment of the invention determines the standard deviation of the incremental offset distances given by:

$$\sigma = \frac{\left[\sum_{i=1}^{N-1}(x_{i+1}-x_i-x_A)^2\right]^{1/2}}{(N-1)} \tag{1}$$

In equation (1), $x_A$ is the average increment between successive offset distances. Instead of the average, a median or a mode may also be used.

Figure 3:
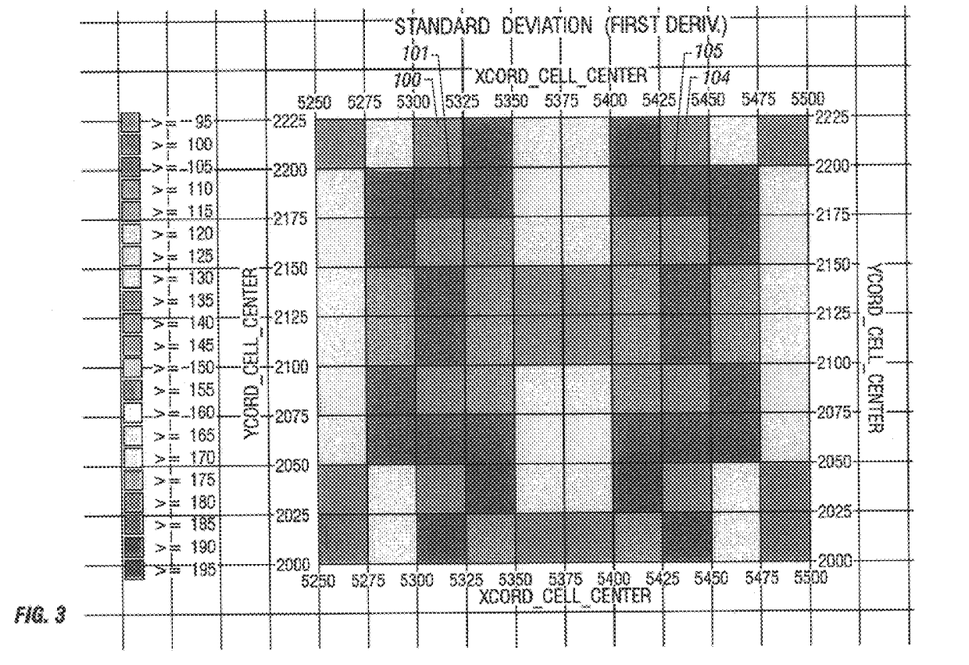
FIG. 3 (in color) is a color display show figure of merit of the data of FIG. 2.

FIG. 3 shows the binned data of FIG. 2 wherein this statistical measure or uniformity of the offset distances has been determined for each bin and the result displayed in a color display. The bins with the smallest standard deviation are shown in green, with increasing values going through blue, violet, yellow, pink and red. Any other coding scheme for mapping the figure of merit to a color chart may be used. In an alternate embodiment (not shown), a gray scale is used to display the figure of merit. As can be seen in the display, bin 202 which corresponds to 102 in FIG. 2 is in red and has among the largest values of the standard deviation of incremental offset distances while bin 200, which corresponds to bin 100 in FIG. 2 has among the smallest standard deviation. Subtle variations, that are not evident in FIG. 2 are clearly seen in FIG. 3: for example, bin 200 is better than bin 201, and bin 204 is better than bin 205. The center of FIG. 3 has four bins in red that have their counterparts in FIG. 2. Close examination of FIG. 2 reveals that while the distribution does appear to be uniform in these four bins, this is an illusion due to the fact that a number of source-receiver offset distances are closely replicated, so that in the bar plot of FIG. 2, these duplicated distances appear as a single broad line.

Those versed in the art would recognize that equation (1) would give a small value to those bins in which, on the whole, the offset distances are uniformly spaced. In some processing applications, this global uniformity is not sufficient and it is desirable to have some local uniformity in the spacing of the offset distances as well. This is accomplished in another embodiment of the invention that uses, as a figure of merit, the second derivative of the offset distance. This may be denoted by:

$$K = \frac{\left[\sum_{i=1}^{N-2}(x_{i+2}-2x_{i+1}-x_i)^2\right]^{1/2}}{N-2} \tag{2}$$

Displays of this figure of merit (not shown) similar to FIG. 3 are obtained for the distribution of distances shown in FIG. 2. Another suitable figure of merit is the product of equations (2) and (3).

Those versed in the art would recognize that other statistical measures could also be determined for a data set and appropriate color displays produced. For example, the user may define a desired distribution of offset distances and use a statistical measure such as the Pearson product moment correlation coefficient as a figure of merit on how much the actual distribution differs from the idealized distribution. Such variations are intended to be within the scope of the present invention.

In yet another embodiment of the invention, the overall survey is evaluated for adequacy of coverage: this is in contrast to the embodiment discussed above which gives a visual display of the adequacy of coverage within each of a plurality of CMP bins. This is best understood with reference to FIG. 4.

Figure 4:
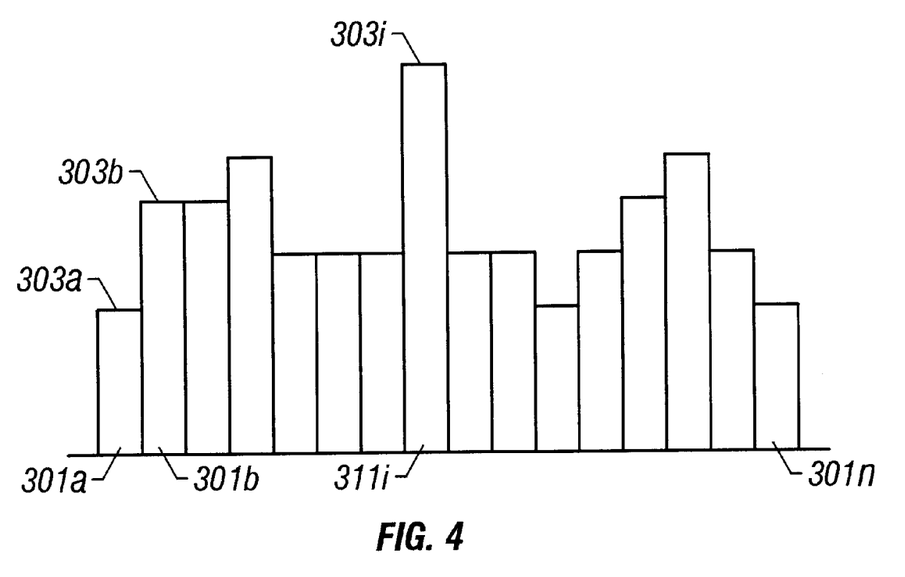
FIG. 4 shows an example of a histogram of offset distributions within a seismic survey.

For this evaluation, the entire data set from all the CMP gathers is sorted by the offset distance and binned into a set of offset bins 301a, 301b . . . 301n. FIG. 4 is a histogram of the number of traces 303a, 303b . . . that have an offset range within the range defined by the corresponding bin. Given this histogram, a number of statistical measures may be used to evaluate the survey.

One such measure that is determined in the present invention is the standard deviation of the data represented in FIG. 4. For computing the standard deviation, each of the bins 301i is replaced by its midpoint value 311i and given a weight proportional the number of samples 303i within the bin. If the ratio of this standard deviation to an ideal increment in source-receiver offset exceeds a predetermined value, then the survey is unacceptable. For this purpose, the ideal increment in source receiver offset is determined from the maximum offset in the survey and the total number of recording channels used for the receivers in the survey.

Another check that is made in the invention is a determination of the total number of duplicate traces. Those versed in the art would recognize that in a typical 3-D seismic survey, there could be many CMP bins that have more than one source-receiver combinations with the same offset distance. While the signal-to-noise ratio for random noise is reduced by having a plurality of traces, little additional information is gained as far as imaging of the subsurface is concerned. Accordingly, in the present invention, duplicate traces are defined as traces with a CMP bin that have offset distances that are less than a prespecified fraction of the ideal increment and a count of such duplicate traces is maintained. In a preferred embodiment of the invention, this fraction is one-eighth. If the number of duplicate traces exceeds a prespecified fraction of the total number of traces in the survey, then the survey is unacceptable. In a preferred embodiment of the invention, this fraction is 20%.

Another quantity that is determined relates to the flatness of the histogram display in FIG. 4. This measure of flatness may be understood by representing the histogram in FIG. 4 as a series $$S=\Sigma n_i \delta(x-x_i) \tag{3}$$

where $n_i$ is the number of traces in the i-th bin, x is the offset distance, and $x_i$ is the offset for the center of the i-th bin. The term "bin" as used with reference to the offset distribution is not the same as the CMP bin referred to earlier. The standard deviation of the set of set of numbers $n_i$ is determined and if the ratio of this standard deviation to the number of traces in the survey exceeds a predetermined value, the survey is considered unacceptable.

In another embodiment of the invention, a desired offset distribution is specified for the entire data set and the Pearson product moment correlation coefficient determined for the desired and actual distribution.

Figure 5:
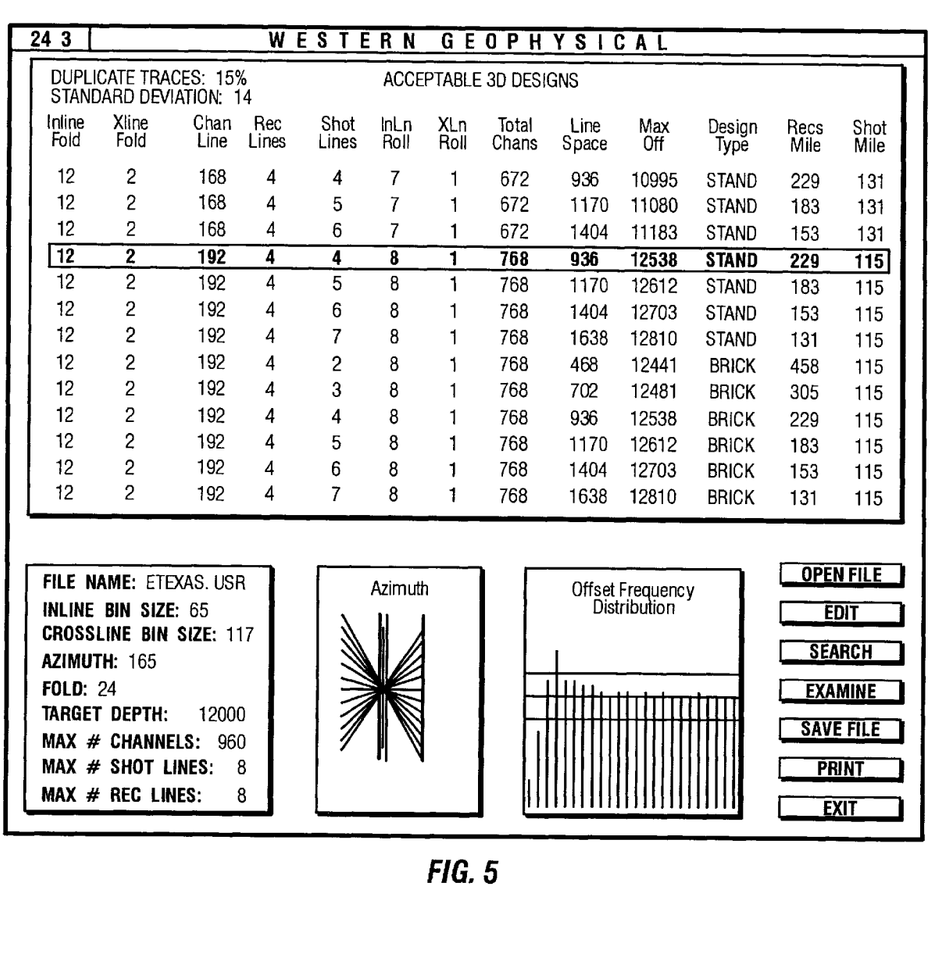
FIG. 5 shows an exemplary screen display of an embodiment of the invention.

FIG. 5 is a display of a computer screen showing an example of the global evaluation method. Thirteen possible acquisition geometries (the rows of data in the upper part of the display) were deemed acceptable. Each column corresponds to a different variable in the acquisition geometry. For purposes of example only, the display in FIG. 5 changed the inline fold, the crossline fold, the number of channels of recording per line, the number of receiver lines, the number of source lines, the in-line roll, the cross-line roll, the total number of channels of recording, the line spacing, the maximum offset, the design type, the receiver spacing and the source spacing. In the lower part of FIG. 5 is shown an example of the azimuthal distribution of data at a selected bin and a display of the offset distribution.

The graphic displays disclosed above in FIGS. 1–3 enable the geophysicist acquiring the seismic data to make judgments about the adequacy of the seismic coverage. The display of FIG. 5, on the other hand, gives an objective evaluation of the acquisition geometries based upon predefined statistical measures of quality. It is not uncommon, however, for different geophysicists to disagree on a ranking of different acquisition geometries. Recognizing that statistical measures discussed above are at best an approximate quantitative measure of such ranking, in another embodiment of the invention, a Neural Net (NN) is used to simulate the subjective evaluation made by one or more geophysicists.

There are two stages in the development of such a NN. The first stage is the training stage. In the training stage, a sampling of various types of acquisition configurations is simulated and for each of the configurations, one or more local and global statistical measures of the quality of the data are determined. The local measures are selected from the standard deviation of the incremental offset for one or more CMP bins from Eq. (1), the second derivative of the offset distance for one or more CMP bins from Eq. (2), and the Pearson product moment correlation coefficient for a desired distribution of offsets. The global measures are selected from the standard deviation of the offset distribution for the entire data set, the number of duplicate traces and the flatness of the offset distribution for the entire data set, and the Pearson product moment correlation coefficient for a desired distribution of offsets. These statistical measures and/or the actual distribution of offsets in the survey are input to the NN and the NN is trained to produce an output that simulates the classification of the surveys by one or more geophysicists.

The classification may be a binary one ("acceptable" and "not acceptable") or may be on a scale of acceptability. Following the training process, the NN is validated by presenting it with statistical measures derived from other acquisition configurations and verifying consistency of the output of the NN with subjective decisions by the same one or more geophysicists. Once the NN has been validated, it may be used with a high level of reliability for analyzing other acquisition configurations.

Those versed the art would also recognize that in some applications, such as converted wave imaging wherein the source sends out a compressional wave that is converted to a shear wave upon reflection at a subsurface reflector, the reflection point is not midway between the source and the receiver even where the reflectors are uniformly flat. The present invention is applicable to such types of seismic prospecting by using a sort-point other than a CMP to define the source-receiver pairs that contribute to a bin. Typically, the sort point lies somewhere between one-half and two-thirds of the way between the source and the receiver. The CMP gather is thus seen to be a special case of a CSP gather in which the sort point is one-half. The present invention includes determination of a figure of merit for such offset distance distributions for a CSP and obtaining displays similar to FIGS. 2, 3 and 5 for the offset. distribution of source-receiver locations that contribute to data in a single bin as well as statistical measures of the quality of coverage.

In many processing applications, such as 3-D migration and anisotropy studies, it is desirable to have a uniform sampling of azimuths. The present invention includes determination of a figure of merit for such azimuthal distributions and obtaining displays similar to FIGS. 2, 3 and 5 for the azimuthal distribution of source-receiver locations that contribute to data in a single bin.

The present invention makes it possible to analyze a number of different acquisition geometries for seismic surveying and select one that, based upon a suitable figure of merit, meets processing requirements involving uniformity of sampling of source-receiver distances and azimuths. If visual examination of the display shows the figure of merit to be unacceptable, then the present invention makes it possible to modify the shot and receiver geometry.

Figure 6:
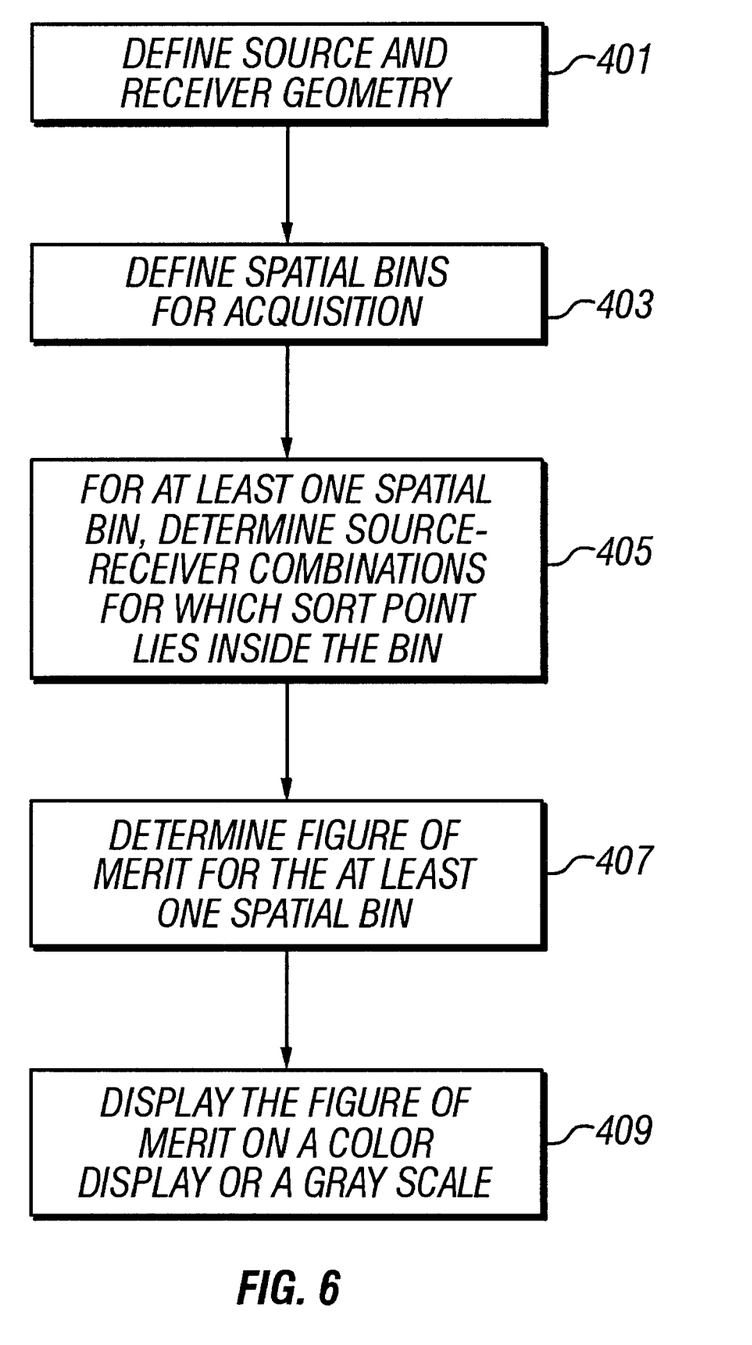
FIG. 6 illustrates principal steps of the method of the present invention.

The method of the present invention is summarized in FIG. 6. The shot and receiver geometry are defined 401. For the defined shot-receiver geometry, spatial bins are define over the region of the survey 403. For at least one of the spatial bins, the source-receiver pairs that have a sort point within the bins are determined 405. The figure of merit (as discussed above) is determined for the at least one spatial bin 407. This figure of merit is then displayed (either on a color scale or on a gray scale) 409. Typically, the figure of merit is displayed over a substantial portion of the survey area.

While the foregoing disclosure is directed to the preferred embodiments of the invention, various modifications will be apparent to those skilled in the art. In particular, those versed in the art would recognize that while the description of the invention above includes ordering of source-receiver combinations in order of increasing distance or azimuth, the invention would work equally well if the ordering were done in order of decreasing distance. It is intended that all variations within the scope and spirit of the appended claims be embraced by the foregoing disclosure.

What is claimed is:

1. A method of evaluating a seismic survey over a survey area of the earth, comprising:
   (a) defining locations of a plurality of receivers deployed over the survey area;
   (b) defining locations of a plurality of source locations over the survey area for transmitting seismic waves into the earth;
   (c) defining a plurality of bins over the survey area, each of said plurality of bins having a location and a bin size; and
   (d) for at least one of said plurality of bins,
      (i) identifying a subset of the plurality of source locations and a corresponding subset of the plurality of receiver locations recording seismic waves from said source locations that have a common sort point within said bin, thereby identifying a plurality of source-receiver combinations,
      (ii) determining a figure of merit that characterizes the identified plurality of source-receiver combinations, and
      (ii) displaying the figure of merit in a visual display selected from a color display and a gray scale display.

2. The method claim 1 wherein the survey area is covered by a body of water.

3. The method of claim 2 wherein the locations of said receivers are at the bottom of the body of water.

4. The method of claim 1 wherein the receiver locations further comprise a plurality of lines having a receiver spacing associated therewith.

5. The method of claim 4 wherein a size of the bins is related to said receiver spacing.

6. The method of claim 1 wherein the common sort point for a source location and a receiver location lies between midway between the source and receiver locations and two-thirds of the way between the source and the receiver locations.

7. The method of claim 1 wherein determining the figure of merit further comprises ordering said identified plurality of source-receiver combinations according to a source-receiver distance to give an ordered set of distances.

8. The method of claim 7 wherein the figure of merit is determined from at least one of (i) a standard deviation of the ordered set of distances, (ii) a second derivative of the order set of distances, and (iii) a Pearson product moment correlation coefficient determined with respect to a desired distribution of the ordered set of distances.

9. The method of claim 1 wherein determining the figure of merit further comprises ordering the identified plurality of source-receiver combinations according to a source-receiver azimuth, to give an ordered set of azimuths.

10. The method of claim 9 wherein the figure of merit is determined from at least one of (i) a standard deviation of said ordered set of azimuths, (ii) a second derivative of said ordered set of azimuths, and (iii) a Pearson product moment correlation coefficient determined with respect to a desired distribution of said ordered set of azimuths.

11. The method of claim 1 wherein displaying the figure of merit in a visual display further comprises using a coding scheme for mapping the figure of merit to the display.

12. The method of claim 1 wherein the source locations further comprise a plurality of lines having a source spacing associated therewith.

13. The method of claim 12 wherein a size of the bins is related to said source spacing.

14. The method of claim 1 wherein each of the plurality of receivers further comprises at least one of (i) a velocity sensor, (ii) a pressure sensor, and (iii) an acceleration sensor.

15. The method of claim 7 further comprising using a trained and validated neural net using as input the ordered set of distances to produce an evaluation of the survey in substantial agreement with an evaluation made by a geophysicist.

16. The method of claim 8 further comprising using a trained and validated neural net using inputs selected from (i) said ordered set of distances, and, (ii) said figure of merit to, produce an evaluation of the survey substantially equivalent with an evaluation made by a geophysicist.

17. A method of evaluating a seismic survey over an area of the earth, comprising:

(a) defining locations of a plurality of receiver stations over the survey area;

(b) defining locations of a plurality of source stations over the survey area;

(c) defining a plurality of bins over the survey area, each of said plurality of bins having a location and a bin size; and (d) for each of said plurality of bins, identifying a plurality of source-receiver combinations consisting of a subset of the plurality of source stations and a corresponding subset of the plurality of receiver stations recording seismic waves from said source locations that have a common sort point within said bin;

(e) determining a figure of merit that characterizes the survey based upon combining all of said plurality of source-receiver combinations for all of the plurality of bins.

18. The method of claim 17 wherein determining the figure of merit further comprises ordering all of said source-receiver combinations for all of said plurality of bins according to increasing source-receiver distance.

19. The method of claim 18 wherein determining the figure of merit further comprises identifying, within each of said plurality of bins, a subset of the plurality of source-receiver combinations having duplicate source-receiver distances.

20. The method of claim 19 wherein identifying said subset of source-receiver combinations having duplicate distances further comprises comparing a difference between distances of a first and second source-receiver combination to a predetermined threshold.

21. The method of claim 19 wherein said figure of merit is related to at least one of (i) a standard deviation of said ordered set of distances, (ii) a number of said source-receiver combinations having duplicate distances, (iii) a flatness of a distribution of said ordered set of distances, and, (iv) the ordered set of distances.

22. The method of claim 21 further comprising using a trained and validated a neural net to use said figure of merit to produce an evaluation of the survey in substantial agreement with an evaluation made by a geophysicist.

* * * * *